United States Patent [19]
Bevard et al.

[11] 3,719,511
[45] March 6, 1973

[54] NON-HARDENABLE, HIGH-DENSITY FILL COMPOSITION AND PROCESS FOR MAKING SAME

[76] Inventors: Marion Wallace Bevard, Route 1, Box 478, Clinton, Md. 20735; Samuel Street Bevard, Jr., 11524 Old Fort Road, Washington, D.C. 20022; Frederick Groom, III, 9029 Falls Chapel Way, Potomac, Md. 20854

[22] Filed: Oct. 26, 1970

[21] Appl. No.: 84,147

[52] U.S. Cl. ..................106/90, 106/95, 106/97, 106/98
[51] Int. Cl. ................................C04b 7/02
[58] Field of Search......106/90, 95, 96, 97, 308, 316, 106/286

[56] References Cited

UNITED STATES PATENTS

| | | | |
|---|---|---|---|
| 2,890,752 | 6/1959 | Crane | 106/90 |
| 2,887,159 | 5/1959 | Harley et al. | 106/90 |
| 2,800,963 | 7/1957 | Roberts | 106/90 |
| 2,776,010 | 1/1957 | Rike | 106/96 |
| 1,288,035 | 5/1918 | Knapper | 106/95 |
| 1,107,979 | 8/1914 | Mitchell | 106/95 |

*Primary Examiner*—James E. Poer
*Attorney*—Brufsky, Staas, Breiner & Halsey

[57] ABSTRACT

An improved non-hardenable, high-density composition especially useful as a backfill material for high-voltage cable installation along with a method for making and using the composition is disclosed. The composition is characterized as an admixture of particulate materials, such as sand, gravel, and crushed stone aggregate, a filler such as portland cement, with or without pulverized limestone, clay, etc. and a lubricant. A quantity of water sufficient to give the admixture good workability can be added in a manner which prevents the cement from hardening. The improved composition is useful as ship ballast in addition to its use in construction as a backfill material for pipes, cables, tunnel liners or the like.

4 Claims, No Drawings

NON-HARDENABLE, HIGH-DENSITY FILL COMPOSITION AND PROCESS FOR MAKING SAME

BACKGROUND OF THE INVENTION

This invention relates generally to new and improved compositions and the method for making same which are free-flowing and non-hardening but yet compactable to a high density. MOre specifically, this invention relates to a fill composition particularly useful for embedding high voltage electric cable, pipes or the like. In one embodiment, the fill composition of the present invention comprises an admixture of mineral particulates, portland cement, and a lubricating agent having a low freezing point and a high boiling point. The composition can optionally include water added last so as to avoid hardening the cement.

To date, a commonly used material for backfilling trenches is ordinary sand, which, because of its low cost and availability is generally satisfactory for non-critical applications. Other fill compositions have been suggested in the prior art for underground pipelines, cables and other specialized applications. For instance, in U.S. Pat. No. 2,355,966 issued on Aug. 15, 1944, buried pipelines are permanently encased in a lightweight material blended with vermiculite and asphalt. In this disclosure the vermiculite and asphalt impart insulating and waterproofing properties to the fill material. However, the fill material becomes rigid to permanently encase the pipe thereby making any subsequent pipe repair work difficult and expensive.

Other backfill compositions suggested in the prior art include U.S. Pat. No. 3,082,111 issued Mar. 19, 1963 and U.S. Pat. No. 3,192,720 issued July 6, 1965. The former describes a composition comprising sand and clay such as bentonite in combination with water for buried electric cables, with the latter patent further including an anticorrosion agent. Although such compositions have certain advantages, they are not altogether satisfactory. For example, where the ambient temperature is high, e.g., 90°F. or higher such materials dehydrate causing adverse changes in the thermal characteristics of the material. Similarly, where the ambient temperature is low, e.g., 32°F. or less, these materials tend to freeze, causing adverse changes in the material properties. Thus, the result is about the same under either condition, namely, a porous or fragmented structure of low density and thermal conductivity. From an operational viewpoint, it is essential that the fill material once positioned and compacted, retain its high density, coherent structure and yet be sufficiently frangible to permit ready penetration to the buried pipe or cable for repair or removal purposes. Where the present composition is used as ship ballast, its ready removal from the ship permits repair work to be made on the hull.

OBJECTS AND SUMMARY OF THE INVENTION

Accordingly, it is an object of the present invention to provide an improved fill material which obviates the difficulties associated with the fill materials of the prior art.

Another object of the present invention is to provide a non-hardening high-density composition using low-cost ingredients from sources available at or near the site of usage wherein the required ingredients are easily blended without the need for specialized operator training or equipment.

Another object of the present invention is to provide an improved backfill composition for high voltage electric cables, pipes, and the like, having outstanding thermal properties and which permits subsequent repair work to be carried out on the encased cable, pipe and the like in an economic manner.

Another object of the present invention is to provide a free-flowing, non-hardening, yet compactable composition which retains a coherent structure under the normal range of outdoor temperatures generally encountered in domestic construction.

Another object of the present invention is to provide an improved composition comprising relatively inexpensive mineral particulates including sand, gravel, and the like, in admixture with a cement filler and a lubricant such as a petroleum oil, with or without water.

Another object of the present invention is to provide a method of formulating the improved composition, as aforesaid, by employing a sequence of steps designed to avoid the formation of a concrete-like mass and to provide a free-flowing, compactable mass.

Broadly, the improved composition of the present invention is a compactable admixture of mineral particles blended together into a coherent but frangible mass impregnated with lubricant. The cohesiveness attained results from the combination of materials and the maximum density gradient employed.

More specifically, the improved composition of the present invention comprises one or more particulate materials of a mineral nature including sand, gravel and stone of coarse and fine aggregate admixed with a cement filler such as portland cement and including a lubricant such as fuel oil or the like. Water can be added relatively large quantities or optionally replaced by the lubricant.

A typical mixed batch includes 1,000–2,000 pounds gravel, 1,000–3,000 pounds sand, 200–600 pounds cement, up to 150 pounds water and 100–500 pounds oil. Careful selection and grading of the particulates produces a composition having optimum density and thermal properties. The resultant composition is ideally suited for high voltage electric cable backfill and possesses numerous advantages over previously used fill compositions. The advantages may be stated as follows:

1. All of the ingredients are available at or near the job site at relatively low cost.

2. The composition can be formulated at the site or nearby and handled in a manner similar to that used with concrete.

3. The composition does not harden, as does concrete, nor does it dry out, and can be used under wide temperature variations, i.e., from below 32°F. to above 100°F., without any appreciable change in the basic structure or utility of the composition.

4. In use, the present composition has improved density and thermal conductivity properties and provides superior underlying support necessary for large diameter pipelines or heavy electric cable without collapsing or further compacting to provide additional voids.

5. The composition once compacted is a coherent dense mass which is frangible, thereby permitting repair to the pipe or cable buried therein.

One of the critical features of the method of the present invention is the manner in which the ingredients are blended. Unexpectedly, it was found that when the lubricating agent is immediately blended with the cement prior to the addition of the other substituents, a highly desirable working composition can be obtained without hydration or setting occurring.

As used herein, the term "non-hardening" means that the composition of the present invention will not become rigid or set permanently as does concrete but will retain its structure as a frangible, coherent mass indefinitely. The particular reasons for the unexpected improved properties obtained from the present composition are not entirely understood. It is postulated that the lubricant coating retards the reaction between the cement and other ingredients so that the formation of concrete is avoided. It will be appreciated that one of the unexpected results of the present invention is the prevention of permanent hardening of the cement even though only a fraction of the water present in the composition would be adequate to chemically harden the cement were it not preconditioned to avoid such hydration.

It should be understood that the ingredients advantageously used in the present invention can be widely varied as to particle size, proportions and the like without destroying the basic utility of the composition. It will be appreciated, however, that in order to obtain the desired properties, blending of coarse and fine particles is recommended. High density compositions are obtained by such careful selection and by the use of a lubricating agent which aids in compacting the materials by reducing the friction between particles. The quantity of lubricant and water can be varied within limits to satisfy the flow characteristics required for handling purposes.

In using the composition as a backfill for electric cables, it was found that the high density of the fill composition produced significantly higher heat conduction. For electric cable high heat conductivity is of paramount importance for dissipating the heat generated in the cable (IR losses) and for preventing hot spotting, insulation breakdown and the like. Optimizing the fill composition for other applications is readily accomplished and well within the ability of those in the art.

It is generally recognized that silicious materials such as silica, quartz and the like have good heat conducting properties. In addition to sand, the composition preferably includes gravel and crushed stone aggregates of the silicious, dolomitic and limestone families. These materials are carefully graded to give particles ranging from 1 inch or less to 325 mesh (Tyler Standard Screen Scale). As a practical matter, particles not exceeding one-fourth inch are selected where the cable covering is easily damaged. With steel pipe the larger particles can be employed. Additionally, mineral fillers or other additives can be added. Typically, the specific gravities of the mineral ingredients will be within the range of 2.50 to 3.30. The chemical composition of the mineral ingredients may be stated as including silica ($SiO_2$), calcium carbonate ($CaCO_3$), magnesium carbonate ($MgCO_3$) and alumina ($Al_2O_3$).

The filler used is conventional cement such as mortar or portland cement. Portland cement as used herein is a generic term embracing all varieties of hydraulic cement or cements which harden when exposed to water.

The lubricant used in the composition can be any conventional material suitable for outdoor exposure and capable of withstanding the vicissitudes of such exposure, including temperature variations, oxidation, microbic attack and the like. Exemplary of lubricants found suitable are the mineral, natural or synthetic oleaginous materials. The lubricant can be a paraffinic, naphthenic, or mixed base crude oil or the lubricant can be a synthetic oil, or a mixture of natural and synthetic oil. If desired, anti-oxidants, anti-rust and anti-bacterial agents can be added. It is only necessary that the lubricant have good temperature properties so that it does not freeze nor volatilize or decompose in use. Advantageously, lubricating oils with a pour point of −20°F. to 0°F. and an upper temperature operating range of about 150°F. is preferred. Petroleum oils, oil emulsions, glycerine glycols such as ethylene glycol, glycerol, silicones, disulfides are illustrative of those found to be acceptable. Generally, the amount of lubricant employed depends on the quantity of cement used in the mix. The greater the quantity of cement, the greater the quantity of lubricant is required. The amount of lubricant will also vary with the desired consistency and workability of the mix. Sufficient lubricant must be added to coat the cement, thereby preventing hydration or permanent hardening of the composition.

The quantity of water used can widely vary depending on the desired working consistency and the final backfill characteristics. Preferably the water content of the compacted composition should not exceed about 8 percent and should be in the range of between 4 and 7.5 percent. The optimum water content has been found to be about 6–7 percent by weight of the total mass. By maintaining close control of the water content of the compacted fill composition, the resulting mass is coherent and capable of supporting pipes, cables and the like while at the same time frangible and easily broken away. Although the composition of the present invention can be prepared without water, it does not lend itself to maximum compaction. For example, attempts to apply pressure in one area only results in the mass "popping up" at another area. On the other hand, when the water is replaced with lubricant, a satisfactory compactable mass can be obtained; however, the economics of such an approach are not entirely satisfactory.

In preparing the composition of the present invention, it should be understood that no special skills or complex procedure is necessary. Conventional techniques used in concrete mixing are readily applicable to formulating the present composition. Hence, the ingredients can be intimately blended by the use of conventional mixers or by hand. Further, the compositions of this invention may be prepared at the job site or at some distance away and transported to the job site to be deposited in the trench or cavity by conventional means. Where relatively small quantities of material are required, hand mixing is most economical; however, in most instances the use of motor operated revolving mixers or the like are more economical and efficient. Generally, the cement and oil are first blended in the mixer by either adding cement to a quantity of oil previously added or by spraying oil over cement. The former procedure is preferred although the latter could also be effectively used. The important and critical aspect is to coat the cement with oil or the like prior to introducing any of the other mineral particulates and water. Even moisture normally associated with sand is sufficient to react with the cement if not precoated with the lubricant. Thereafter, one or more of the particulates are added and blended. Finally, water is added in quantities sufficient to provide a proper consistency. Generally, where the composition is to be transported it is desirable to keep mass highly fluid. Thus, water is added in amounts varying from 8–10 percent. At the site of use, excess water is removed during compaction to yield the 6–7 percent optimum previously discussed.

It should be understood that the physical properties of the present composition can be adjusted to fit the application. For example, where the composition is a fill material for enveloping buried high voltage electric cables, the thermal properties are of paramount importance. It has also been found that by blending differing particle sizes of mineral particulates coated with oil, a higher density and greater thermal conductivity is obtained. In measuring the thermal properties of fill materials the term "RHO" is used to indicate the thermal resistivity of the material tested. This measurement is the inverse of thermal conductivity. One highly satisfactory composition formulated for electrical cable installation or the like has an RHO value of below about 25 and a density greater than about 142 pounds per cubic foot.

From the foregoing description and examples following, it can be readily observed that the improved composition of the present invention has novel properties permitting use in diverse applications. The aforesaid composition is prepared and formulated to yield a non-hardenable, high density is product compactable but yet readily fragmentable. The combination produces a product with minimal interstices.

Having described the invention in general terms, the following examples are set forth to more particularly illustrate the invention. These examples, however, are not meant to be limiting. All parts are expressed in weight percent.

EXAMPLE I

Tunnel liners used in highway or railway construction are set in place at the excavation site and backfilled with material prepared as follows:

Into a conventional cement mixer, 50 parts of moist gravel of a particulate size ranging from three-fourths inch to 4 Mesh are mixed with 30 parts of commercially washed sand of a particle size ranging from one-fourths inch to 200 Mesh. Also added are 10 parts masonry cement, 3 parts of water and 1 part No. 2 diesel oil. Oil and cementious materials are combined first. The mixture is then rotated and intimately blended. The admixed product is delivered into a chute and directed (by chute or pumped) into the space behind the tunnel liner. The material is compacted by use of a vibrator. After several months the composition is found to maintain its supporting characteristics and still is sufficiently frangible to permit chipping and ready penetration therein.

EXAMPLE II

Trenches, excavated for 115 KV or 230 KV oil and pipe encased electric cable, are backfilled as follows:

The composition of the present invention is prepared away from the job site by blending 40 parts of gravel with 40 parts of commercially washed concrete sand, 10 parts portland cement, 3 parts water and 1 part fuel oil, in the manner described in Example I. During transit to the excavation site the mixture is continually rotated and mixed. The resultant product is dumped into the trench with the cable placed therein. Compaction is thereafter carried out on the material using a vibrator. In this manner densities on the order of 145 pounds per cubic foot are obtained. The thermal properties of the fill material are superior to ordinary earth, sand or the like. The composition was observed to have a coherent appearance capable of supporting earth placed thereon. However, the fill composition could be easily penetrated and fragmented to expose the cable located internally.

EXAMPLE III

The trench backfill composition of Example III is prepared by increasing the oil content to 6 parts and the water centent to 8 parts, the other components remaining substantially constant. A satisfactory backfill composition is obtained.

EXAMPLE IV

A composition formulated for use in ship ballasts tanks is made by mixing 20 parts gravel, 17 parts sand, 7 parts cement and 1 part oil and thereafter introducing said mixture into the appropriate ballast tank or section. The amount of material to be added depends on the load to be carried by the ship. If desired, anti-corrosion agents and bacteriostats may be included. The ballast composition can be removed from the ship with relative ease should repair work on the hull become necessary.

It should be appreciated that the present invention is not to be construed as being limited by the illustrative embodiments. It is possible to produce still other embodiments without departing from the inventive concept herein disclosed. Such embodiments are within the ability of one skilled in the art.

What is claimed:

1. A non-hardening flowable composition of matter for backfilling electric cables and the like characterized as having a density of at least 142 pounds per cubic foot and a RHO value of below about 25 after compaction and being readily penetratable months after installation, said composition consisting essentially of:

an admixture of coarse mineral particulates sized from about one-fourth inch to about 1 inch taken from the group consisting of silicious, dolomitic, limestone materials and mixtures thereof;

portland cement coated with a lubricant taken from the group consisting of natural and synthetic oils to prevent setting of said cement; and water in an amount ranging from about 4 percent to about 10 percent by weight of said admixture.

2. The composition of claim 1 wherein said water content is from 6 to 8 percent by weight.

3. The composition of claim 1 further including additives taken from the group consisting of anti-oxidants, anti-rust, anti-bacterial agents and mixtures thereof.

4. The method of making the composition recited in claim 1 the steps comprising:
 a. first intimately mixing a predetermined quantity of cement and lubricant;
 b. adding to said mixture graded mineral particulates designed to give maximum density and minimum voids;
 c. adding water from 6% to 8% by weight of said admixture to the mixture of (b) to give free-flowing characteristics to said mass; and
 d. blending said mass uniformly.

* * * * *